3,270,261
DRY OXIDE CAPACITOR

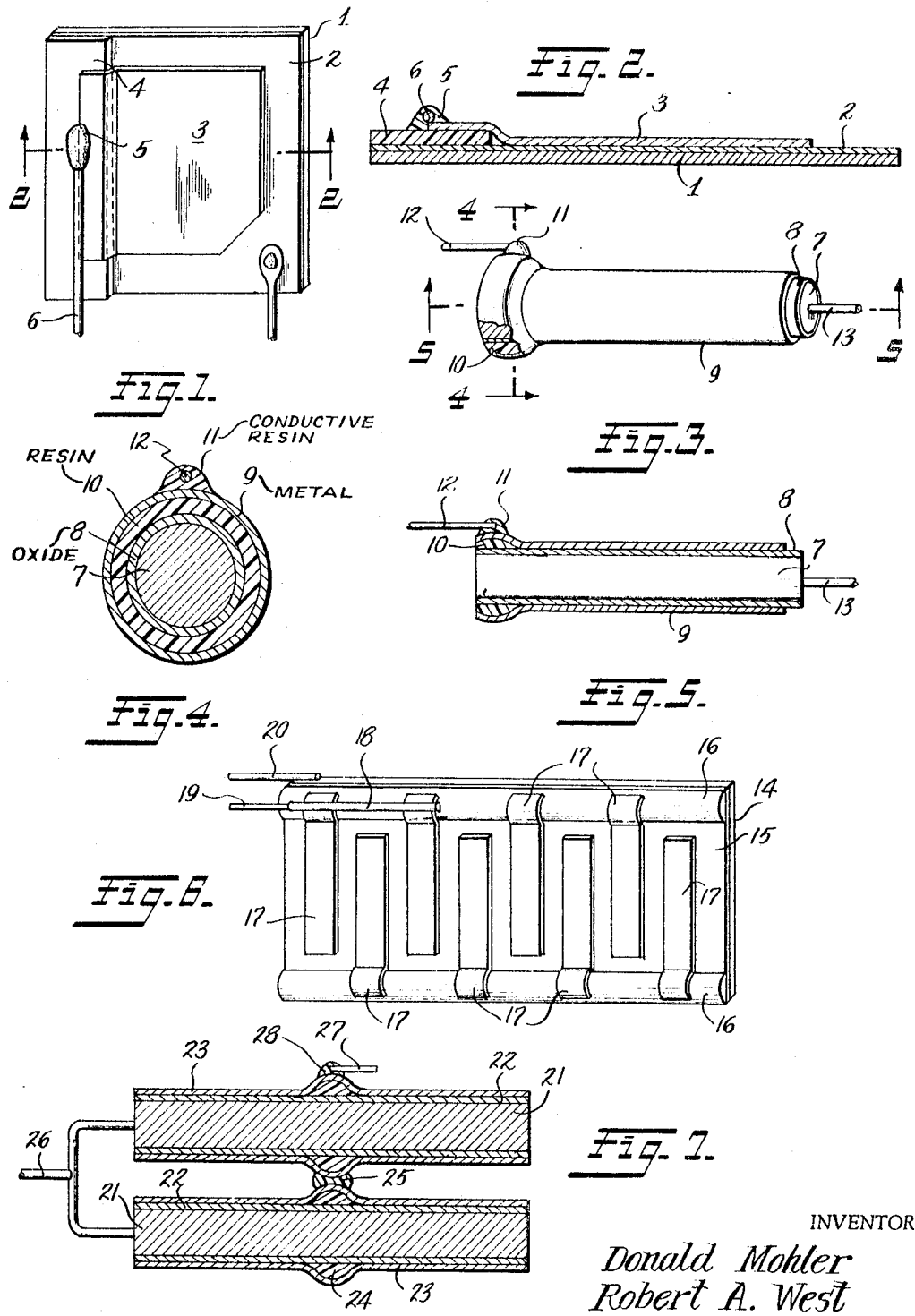

Donald Mohler, Saratoga Spa., and Robert A. West, Hudson Falls, N.Y., assignors to General Electric Company, a corporation of New York
Filed May 3, 1965, Ser. No. 452,839
12 Claims. (Cl. 317—258)

The present invention relates to electrical capacitors, and more particularly to an improved dry type electrical capacitor and the method of producing the same. The present invention also relates to multiple unit capacitors and the method of producing the same.

Conventional electrolytic capacitors utilizing liquid electrolytes have several drawbacks, largely due to the possibility of leakage or evaporation of the contained electrolyte. Escape of the electrolyte frequently leads to deterioration of the operating efficiency of the capacitor, results in the corrosion of the casing and other metal parts and causes other detrimental effects.

To avoid these difficulties, several attempts have been made in the past to construct solid, dry types of capacitors wherein one electrode is a film forming metal on which an oxide film is anodically formed to serve as the capacitor dielectric, and an electrically conductive layer or counter-electrode is deposited over the dielectric oxide film to serve as the second electrode. The prior types of such solid capacitors, however, have not been fully satisfactory for a variety of reasons and previously the solid dry capacitor was not fully comparable or competitive with conventional capacitors. This was due mainly to problems arising from lead attachment to the counter-electrode, low dielectric strength of conventional anodic dielectric film in the dry state, poor self-healing properties, and sensitivity to moisture. It has been found that when leads are attached to the vaporized metal counter-electrode the operating voltage of the capacitor is low even though dual layers, first a porous and then a dense layer, of anodic oxide formations are employed. Self-healing or clearing does not take place in areas where the leads are attached directly upon the metallized, oxide coated aluminum structure. In fact, if the lead is affixed directly upon this metallized oxide surface, the result of this is to lower the maximum operating voltage of the entire capacitor.

To avoid such problems of the prior art, a small area of a non-conductive film is deposited directly upon the oxide dielectric layer and then the metallized coating serving as the counter-electrode is deposited upon the oxide layer and extended to cover the non-conductive film area also. This structure permits lead attachment to the metallized coating, for example by use of conductive epoxy, to be successful. That is, the self-healing properties are not affected by the lead connection to the counter-electrode. The dielectric strength of this improved system is 2 to 3 times higher than the prior art previously described.

The reason for this improved performance is believed to be that the oxide dielectric layer inherently contains some small fissures which become filled with conducting material as the counter-electrode material is applied. The resulting conductive dendrites built up in the fissures serve as paths for leakage currents as the potential across the electrodes is increased. It is the heat from the I²R losses caused by such leakage currents that is believed to result in clearing or healing of the dielectric layer. This heat virtually causes the dendrites to explode out through the counter-electrode thereby freeing the dielectric layer of the conductive inclusions and raising the operating voltage of the entire capacitor. Pursuant to this theory it becomes apparent that if the lead attachment were made without interposing an insulating layer between the dielectric layer and the counter-electrode, such a clearing action could not occur because the dendrites could not explode out through that part of the counter-electrode under the lead.

Further improvement over the prior art capacitors is obtained by reducing moisture sensitivity with respect to dielectric strength and power factor through use of the double formation technique, viz., porous oxide formation followed by dense oxide formation, followed by dip coating the capacitor with a silicone elastomer, such as G.E. LTV–602 manufactured by the General Electric Company in Waterford, New York.

When such a coating is employed the self-healing properties are preserved and mechanical protection against damage by subsequent encapsulation is achieved. This is believed to provide a unique capacitor structure since most protective plastic coatings tend to inhibit the clearing or self-healing properties. Some protective coating, however, is indeed required to provide a moisture proof enclosure. Then too, an elastomeric base encapsulation such as the G.E. LTV–602 makes it possible to use a heavier mechanically protective, hardenable dip coating such as an epoxy. This feature is described more fully in copending application Serial Number 331,454, filed December 18, 1963, and assigned to the assignee of this application. These hard coatings often destroy the capacitor due to their shrinkage, but with the silicone elastomeric base coating such damage is unlikely to occur.

Briefly stated, the present invention relates to an improved dry oxide capacitor having a film forming electrode with an anodically formed oxide coating thereon, an electrically conductive, thin, counter-electrode deposited over a major portion of the dielectric layer, an interposed band of electrically non-conductive resinous material interposed between the dielectric layer and the counter-electrode in the area directly above the band of electrically non-conductive material.

The present invention will be more fully discussed in conjunction with the accompanying drawings in which:

FIG. 1 is a perspective view of an embodiment of a capacitor device constructed in accordance with the present invention;

FIG. 2 is a cross-sectional view in exaggerated scale of the device of FIG. 1 taken along the line 2—2;

FIG. 3 is a perspective view in partial section of another embodiment of a capacitor device constructed in accordance with the present invention;

FIG. 4 is a cross-sectional view in exaggerated scale of the device of FIG. 3 taken along the lines 4—4;

FIG. 5 is cross-sectional view on an exaggerated scale of the device of FIG. 3 taken along the lines 5—5;

FIG. 6 is a perspective view of a multiple unit capacitor device constructed in accordance with the present invention;

FIG. 7 is a cross-sectional view in exaggerated scale of another multiple unit capacitor constructed in accordance with the present invention.

Referring now to the drawings and particularly to FIGS. 1 and 2, there is shown a solid dry capacitor constructed in accordance with the present invention which comprises a metal plate 1, preferably of aluminum, serving as the base electrode, an anodically formed oxide dielectric layer 2, a metal counter-electrode 3, a layer of electrically non-conductive resin 4 interposed between the metal counter-electrode 3 and the anodic oxide dielectric 2, and lead 6 attached to the metal counter-electrode 3 by an electrically conductive resin 5. The interposed resin 4 provides a solid base upon which to secure the lead to the counter-electrode and the conductive resin 5 allows lead 6 to be secured to the counter-electrode in a simple, easy and inexpensive manner.

The metal plate 1 is preferably aluminum though other metals and metal alloys can also be used such as tantalum, columbium, titanium-zirconium, titanium-molybdenum, etc. While tantalum in its oxide form has a dielectric constant 2 to 3 times higher than aluminum, aluminum is preferred because it is inexpensive and can therefore be used to provide a commercially competitive capacitor. Preferably, the metal which is used is of high purity since impurities cause flaws in the dielectric layer which are logical points for dielectric breakdown to occur. Thus, aluminum of 99.99 percent purity is preferably used in the formation of the capacitors of the present invention and, in the form shown in FIG. 1 of the invention, a metal foil having a thickness of approximately 0.0005–0.010 inch is used.

In the description of the invention which follows, the metal plate or base electrode will be referred to as an aluminum plate for ease of discussion, it being understood that the above noted metals, as well as other film forming metals and alloys, are encompassed by the description.

Formed over the aluminum plate 1 is a thin anodically deposited aluminum oxide dielectric film, the oxide corresponding to the metal of the plate 1. This oxide layer provides the dielectric for the capacitor. The oxide layer is preferably composed of a porous oxide layer followed by a dense oxide layer for greater dielectric strength. Generally, a metal base such as aluminum is placed in an anodizing bath containing an electrode which is conducive to porous oxide formation such as oxalic acid. Following the deposition of the porous oxide layer, the base is placed in a bath containing an electrolyte such as boric acid which is conductive to dense oxide formation. The particulars of the oxide formation are taught in Burger et al. Patent 2,930,951 issued March 29, 1960 to the assignee of the present invention.

Deposited over the anodic oxide dielectric layer 2 is a thin metal counter-electrode 3 which may be of the same aluminum composition as the plate 1 or of any other suitable electrically conductive materials such as tin, copper, lead, zinc, nickel, gold or non-metallic solid conductive materials. The metallic materials may be applied by any metallizing or other suitable depositing procedures. A satisfactory metal coating may be produced, for example, by vacuum evaporation of the desired metal, or by sputtering, chemical deposition or the like. This provides an economical method of forming the counter-electrode. An aluminum counter-electrode of approximately 2,000 angstroms has been employed in the present example, however thicknesses of 1,000 to 4,000 angstroms have been found to be thin enough to permit clearing or healing and yet thick enough to maintain power factor within reasonable limits. Thinner films tend to increase power factor and thick films limit operating voltage by inhibiting the self-healing characteristics of the capacitor. A dip coating (not shown) of a silicone elastomer, such as G. E. LTV–602, is used in most applications to improve moisture impermeability and protect the capacitor.

As can be seen in FIG. 1, the counter-electrode 3 does not cover the entire area of plate 1 to avoid the possibility of a short circuit between the two electrodes. This may be accomplished by masking the area by use of suitable organic film which is removed by solvent or by the use of a shield.

Prior to the deposition of the counter-electrode, the non-conductive resin layer 4 is applied over the dielectric layer 2 in the area where the lead is to be connected to the counter-electrode. This layer can be applied by painting, dipping, spraying, roller coating, etc., whichever is most convenient. While the layer may be just under the immediate area where the lead is to be attached, for convenience of manufacture the layer may extend the length of plate 1 as is shown in FIG. 1.

The important factor of the non-conductive resin layer 4 is that it be interposed between the dielectric layer 2 and the counter-electrode 3, the interposition being of sufficient length and width to provide a secure base upon which to secure the lead 6 to the counter-electrode 3. However, the layer 4 should be only of the length and width necessary for strength as the use of a larger layer reduces the capacity of the capacitor which is undesirable. Preferably, the resin is an epoxy or silicone type resin, the epoxy resin being illustrated by Hysol 4148, manufactured by Hysol Corp. Normally, the epoxy resin is used. If high temperature application of the capacitor is desired, capacitors capable of operation at 200° C. may be made by using a silicone resin in place of the epoxy resin. The silicone resins may be illustrated by G.E. SR–80 manufactured by the General Electric Company.

Following the deposition of a counter-electrode with a non-conductive resin interposed between the counter-electrode 3 and the dielectric, the lead 6 for the counter-electrode is attached to the counter-electrode film by a small quantity of electrically conductive resin 5. The resin may be any hardenable resin such as an epoxy resin which has metal or carbon particles admixed therein for electro-conductivity. The main and important character of the resin is that it be devoid of any material which would chemically attack the lead or the counter-electrode. As an illustration, an epoxy resin containing an aromatic amine curing catalyst if applied to a counter-electrode of aluminum would cause the formation of an insulating oxide on the surface of the aluminum thereby destroying the electrically conductive connection between the lead and the counter-electrode and making the capacitor useless. Other agents within the resins such as a free carboxylic acid may also cause the same effect. Therefore care must be taken in choosing an appropriate resin which is free of oxidizing agents. Again, if the capacitor is to be exposed to high temperature, a silicone resin is desirably used to attach the lead to the counter-electrode. The electrically conductive resin desirably has an electrical resistivity of not more than 0.1 ohm centimeter.

While the invention is particularly directed to the use of an electrically conductive resin to attach the lead to the counter-electrode, solder may also be used for the securing means. However, this is less advantageous as the area of the non-conductive resin must be enlarged for effective mechanical strength, which enlargement reduces the capacity of the capacitor. The present invention, however, is intended to include the embodiment of a soldered lead with the non-conductive resin layer interposed between the counter-electrode and the dielectric layer for mechanical strength.

By way of specific example, a conductive epoxy resin (56CAI Emerson & Cuming) catalyzed by an aliphatic amine curing catalyst has been effectively used.

FIGS. 3–5 depict another capacitor embodiment formed in accordance with the present invention in which the base of the capacitor is a wire. An aluminum wire 7 has formed over the outer surface thereof an anodic oxide layer 8 by the method described hereinbefore. A band of non-conductive resin 10 is applied to one end of the wire over the anodic oxide layer and a metal counter-electrode 9 of gold is applied over the major length of the wire base. A lead 12 is attached to the counter-electrode by means of a small amount of a conductive resin 11, the lead being attached over the area of the counter-electrode which has the non-conductive resin therebeneath. Another lead 13 is butt welded to the base wire 7 to complete the capacitor.

The teachings of the present invention also facilitate construction of multiple capacitor units, which are highly useful in the construction of complex electronic equipment. A feature of these multiple units is that a variety of lead connections are possible in series or parallel to provide in a small area extensive variations in capacitance values. These multiple units may be formed from a flat plate electrode base or wire bases as desired.

Referring to FIG. 6, a flat multiple capacitor unit is formed of a flat aluminum foil base 14 which has an anodic oxide dielectric layer 15 thereon. Narrow bands of non-conductive resin 16 are positioned on opposite edges of the base 14, though a single band may also be used. Metal counter-electrodes 17 in staggered relation to one another are deposited over the base and the non-conductive bands. The electrodes extend from one band almost to the other and from the opposite band almost to the first. The counter-electrodes are deposited as described hereinbefore, a mask being used to form the alternately extending counter-electrodes. A layer of conductive resin 18 is used to interconnect various counter-electrodes as desired, the layer 18 being only illustrative of one of the many possible interconnections which can be made. A lead 19 is adhered to the counter-electrodes by the conductive resin layer 18 and another lead 20 is secured to the base to complete the capacitor.

In FIG. 7, a multiple unit capacitor using wire as the base as described hereinbefore is shown. Two aluminum wires 21 have formed thereon dielectric layers of anodic oxide 22. In the center of each wire base, a band of non-conductive resin 24 is applied and a counter-electrode 23 is deposited over the resin band 24 and the dielectric layer 22. A small amount of conductive resin 25 is used to unite the two counter-electrode layers. A lead 27 is attached to one of the counter-electrodes using a small amount of the same conductive resin as depicted by 28. A lead connection in parallel indicated by 26 completes the capacitor. While only two capacitors are shown being united, one may interconnect many. Series connection may also be used.

For full efficiency under operating conditions where moisture may be a factor, it is preferable that the capacitors of the present invention be protected from the action of the water vapor. To this end, the capacitor may be encapsulated or enclosed in a suitable outer protective means. The encapsulation may be accomplished with an outer enveloping coating of a suitable moisture impervious composition having a thickness of approximately 40 mils. Silicone resin coating compositions are particularly suitable for this purpose, especially where high operating temperatures are encountered, but various other known types of moisture impervious coating materials such as polyethylene glycol terephthalate resin or epoxy resin may also be used.

Alternatively, the capacitor may be enclosed and hermetically sealed within a suitable moisture impervious container made of glass, metal, ceramic or other material as is well known. The leads pass through end discs sealing the interior of the container and making it impervious to the passage of moisture.

While the present invention has been described with reference to particular embodiments thereof, it will be understood that numerous modifications may be made by those skilled in the art without departing from the scope of the invention which is defined in the claims which follow.

We claim:

1. An improved dry anodic oxide capacitor comprising,
   (1) an electrically conductive metal base electrode having a dielectric layer of anodically formed oxide thereon;
   (2) an electrically conductive counter-electrode deposited over said dielectric layer;
   (3) an interposed band of electrically non-conductive resinous material interposed between only a portion of said dielectric layer and said counter-electrode; and
   (4) a lead directly overlying and attached to said counter-electrode with an electrically conductive resinous material substantially free of oxidizing agents; said interposed band being located beneath the area of said counter-electrode where said lead is attached.

2. An improved dry oxide capacitor as recited in claim 1 in which said metal base is aluminum and said anodically formed oxide is aluminum oxide.

3. An improved dry oxide capacitor as recited in claim 1 in which said electrically non-conductive resin is selected from the group consisting of epoxy resins and silicone resins.

4. An improved dry oxide capacitor comprising,
   (1) a flat sheet of aluminum foil having a dielectric layer of anodically formed aluminum oxide thereon;
   (2) an electrically conductive counter-electrode deposited over a major portion of said dielectric layer;
   (3) an interposed band of electrically non-conductive resinous materials along only one edge of said flat sheet interposed between said dielectric layer and said counter-electrode;
   (4) a lead attached to said counter-electrode with an electrically conductive resinous material substantially free of oxidizing agents; said interposed band being located beneath the area of said counter-electrode where said lead is attached.

5. An improved dry anodic oxide capacitor as recited in claim 4 in which said non-conductive resinous material is selected from the group consisting of epoxy resins and silicone resins.

6. An improved dry anodic oxide capacitor comprising;
   (1) an aluminum wire having a dielectric layer of anodically formed aluminum oxide thereon;
   (2) an electrically conductive counter-electrode deposited over said dielectric layer;
   (3) a band of electrically non-conductive resinous material interposed between only a portion of said dielectric layer and said counter-electrode at one end of said wire;
   (4) a lead directly overlying and attached to said counter-electrode with an electrically conductive resinous material substantially free of oxidizing agents; said lead being attached to the area of counter-electrode having said band of non-conductive resinous material therebeneath.

7. An improved dry anodic oxide capacitor comprising, in combination, an assembly of electrically connected capacitor units, each capacitor unit being a capacitor as described in claim 6.

8. A multiple capacitor unit comprising,
   (1) a flat electrically conductive metal sheet having a dielectric layer of anodically formed oxide thereon;
   (2) at least one band of electrically non-conductive resinous material deposited along only the edge of said sheet;
   (3) electrically conductive counter-electrodes deposited on said sheet, said counter-electrodes being applied over said band of non-conductive resinous material and said dielectric layer and being separated from each other to provide separate counter-electrodes; and
   (4) an electrically conductive bridge directly overlying and interconnecting said counter-electrodes to form the leads for a multiple capacitor.

9. A multiple capacitor as recited in claim 8 in which said metal sheet is aluminum.

10. A multiple capacitor as recited in claim 8 in which said non-conductive resinous material is selected from the group consisting of epoxy resins and silicone resins.

11. A multiple capacitor as recited in claim 8 in which said bridge is formed of electrically conductive resinous material substantially free of oxidizing agents.

12. A multiple capacitor as recited in claim 8 in which two bands of electrically non-conductive resinous material are deposited on said sheet, one on each edge of said sheet, in which said counter-electrodes are alternately attached in staggered relation to one another and to said bands and two of said bridges overlying said bands to interconnect alternate counter-electrodes.

(References on following page)

References Cited by the Examiner

UNITED STATES PATENTS

| | | | |
|---|---|---|---|
| 2,728,036 | 12/1955 | Steiner et al. | 317—260 |
| 2,871,428 | 1/1959 | Shen | 317—258 X |
| 2,930,951 | 3/1960 | Burger et al. | 317—258 X |
| 3,113,253 | 12/1963 | Ishikawa et al. | 317—258 |

OTHER REFERENCES

IBM Technical Disclosure Bulletin, vol. 1, No. 3, October 1958, pp. 1 and 2 relied on.

LARAMIE E. ASKIN, *Primary Examiner.*

ROBERT K. SCHAEFER, *Examiner.*

D. J. BADER, *Assistant Examiner.*